United States Patent Office 3,573,261
Patented Mar. 30, 1971

3,573,261
POLYACYLAMIDRAZONE CARBOXYLIC ACID POLYMERS AND THEIR PRODUCTION
Hilde Kersten, Mechenhard, and Gerhard Meyer, Obernburg, Germany, assignors to Glanzstoff AG, Wuppertal, Germany
No Drawing. Filed July 22, 1969, Ser. No. 843,748
Claims priority, application Germany, July 27, 1968,
P 17 95 011.7
Int. Cl. C08g 20/32
U.S. Cl. 260—78                                      10 Claims

ABSTRACT OF THE DISCLOSURE

Polyacylamidrazone polymers which contain carboxylic acid groups and which are soluble in strongly polar organic solvents, said polymers being produced by reacting pyromellitic acid anhydride with an bisamidrazone, e.g. oxamidrazone, in approximately equimolar proportions and in a strongly polar organic solvent at about 0–70° C., preferably 15–50° C. The polymers are especially useful as films, coatings and the like.

---

In the production of polyimides resistant to high temperatures frim aromatic tetracarboxylic acid dianhydrides and diamines, there has been formed as an intermediate product a polymeric amidoacid having recurring units of the formula:

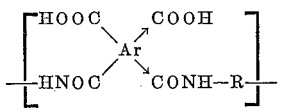

in which Ar represents aryl such as phenyl, R is a divalent hydrocarbon radical, and the arrows → designate interchangeable isomeric positions, i.e. such that the polymer chain is randomly formed through one of the two carboxyl groups forming each initial anhydride group. While the polyimides are known to be insoluble and unmeltable products, the above-noted intermediate polyamidoacids are generally soluble in suitable solvents and can be cast, molded or shaped therefrom. Cyclization into the polyimide can then be brought about by heating the shaped product.

Another class of temperature- or heat-resistant polymers are produced by the reaction of aromatic tetracarboxylic acid dianhydrides, especially pyromellitic acid dianhydride, with aromatic tetramines. Most of these polymers, known as pyrrones or polyimidoazopyrrolones, remain unmeltable at a temperature of 350° C. but are soluble in strongly polar organic solvents when they have a relatively low molecular weight. Products of higher molecular weight can be practically dissolved only in concentrated sulfuric acid so as to be very unsatisfactory for shaping or molding operations.

Thus, while it is known that the polyimide precursors, i.e. the corresponding polyamidoacids, can be shaped from their solutions, similar processes for the production of shaped products from pyrrolones have not been carried out.

One object of the present invention is to provide a new class of polymers capable of being shaped or formed from their solution in a solvent while also being readily converted into a heat-resistant polymer by cyclization. Another object of the invention is to provide a process for the production of the new polymers.

In accordance with the invention, it has now been found that valuable new polymers can be prepared which are soluble in strongly polar organic solvents and which consist essentially of recurring units of the formula:

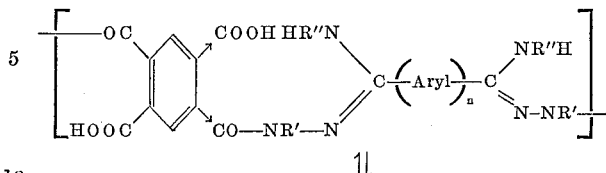

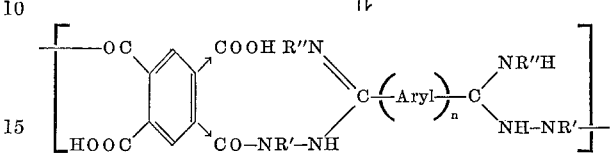

wherein the arrows → denote interchangeable isomeric positions, i.e. such that the two carboxyl groups (—COOH) are in either para- or meta-position to each other, and wherein $n$ is zero or 1, aryl represents 1,4-phenyl or 1,3-phenyl and R' and R" denote hydrogen, methyl or phenyl. It will be noted that the bisamidrazone portion of the polymer has at least two toutomeric forms as indicated above, and for purposes of convenience, only one tautomeric form of the amidrazone is set forth in the remainder of this specification and the claims, other tautomers being fully equivalent to the particular tautomer which is actually set forth.

For the production of the new polymers, pyromellitic acid dianhydride is reacted with oxal-, terephthal- or isophthal-bisamidrazone or certain N-substituted methyl or phenyl derivatives thereof in a molar ratio of 1:0.9 to 0.9:1, preferably 1:0.97 to 0.97:1, i.e. approximately equimolar proportions, in a strongly polar organic solvent and at a temperature of about 0° C. to 70° C., preferably about 15° C. to 50° C.

The polyacylamidrazone carboxylic acid produced in accordance with the invention is obtained in good yields and with a relatively high molecular weight. It has been found that both the solvent employed as the reaction medium and also the amounts of the two reaction components or monomers have an influence on the chain length of the polymer. Especially favorable results are obtained when using organic sulfoxides as solvents such as dimethyl sulfoxide or tetramethylene sulfoxide.

In addition, however, one can also obtain satisfactory polymers with other strongly polar organic solvents, especially organic sulfones, such as tetramethylene sulfone or strongly polar nitrogenous organic bases such as formamide, dimethyl formamide, dimethyl acetamide, N-methyl pyrrolidone, hexamethylphosphoric acid triamide and tetramethyl urea.

It is also possible to carry out the reaction with the addition of one or more salts such as LiCl, LiBr, NaSCN, KSCN, LiSCN, $ZnCl_2$ or $NH_4Cl$, especially the alkali metal or amonium chlorides and bromides. It is advisable to carefully purify the initial reactants as well as the solvent prior to their use in the polymerization reaction. Also, it is desirable to exclude oxygen and water from the reaction, e.g. by conducting the reaction under an inert atmosphere and with substantially anhydrous reactants while excluding moisture from the reaction medium.

Pyromellitic acid dianhydride is one of the two monomeric reactants and can be easily purified by sublimation over silica gel in a vacuum. The bisamidrazone as the other reactant is best purified by recrystallization.

It is preferable to intensively mix the two monomeric components and to continue mixing the reaction medium during the polymerization while cooling to remove the exothermic heat of the reaction, i.e. so as to maintain the temperature below 70° C. and preferably below about 50° C.

The solution of the polyacylamidrazone carboxylic acid obtained in the reaction can be directly poured or cast into a clear yellow, flexible film which is preferably dried at a temperature of about 40° C. to 50° C. in vacuum and under a nitrogen atmosphere to obtain a solid filmaceous product of this polymer. By further heating, especially at higher temperatures, the polyacylamidrazone carboxylic acid undergoes a cyclic dehydration to form a linear polymer chain of condensed rings it R' is hydrogen. This subsequent cyclization occurs by condensation of the individual pairs of carboxy and hydrazide groups which appear in the initial polymer chain as follows:

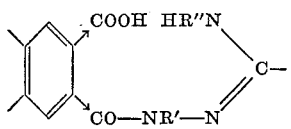

it being again understood that the arrows→indicate equivalent and interchangeable isomeric positions. After such cyclization, the polymer becomes highly insoluble and very heat resistant. The initial polyacylamidrazone carboxylic acid is therefore particularly useful as a solvent-soluble polymer capable of being cast or shaped and then cyclized to form a solvent-resistant, non-meltable and heat-resistant film or coating.

One reaction of pyromellitic acid and oxamidrazone is known from the work of W. Ried and R. Giesse entitled "Uber Einfache und Gemischte Thermostabile Polytriazole," wherein the reaction has been carried out in boiling pyridine to obtain a brown powder which is soluble only in hot dimethyl formamide or in a 2 N sodium hydroxide solution. According to analysis, the product represents a chain-formed polyadduct but is not identical to the polymer of the present invention as represented by the recurring units:

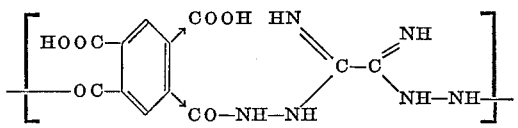

e.g. as prepared in Example 1 below. It has been established that the infrared spectrum of the corresponding Ried and Giesse reaction product exhibits a strong double band at 1340 and 1360 cm.$^{-1}$, while the neighboring amide bands at 1650 and 1540 cm.$^{-1}$ as well as the γ—OH vibration of the —COOH group at 900–950 cm.$^{-1}$ and the —OH vibration in the range of 2500 to 3000 cm.$^{-1}$ are absent. Thus, the IR-spectrum clearly identifies and distinguishes the polymer of the present invention as set forth in Examples 1–3 and 8–9 below from the reaction product obtained by Ried and Giesse.

The preparation of the polymers of the present invention is further illustrated in detail by the following examples:

EXAMPLE 1

To a solution of 1.17 grams (10.1 millimol) of highly purified oxalic acid bisamidrazone in 25 ml. of freshly distilled dimethyl sulfoxide, there are introduced 2.18 grams (10 millimol) of solid pyromellitic acid dianhydride which has been purified by sublimation over silica gel in a high vacuum. The reactants are intensively mixed under an inert nitrogen atmosphere and with the exclusion of moisture. By cooling, the temperature is maintained during the reaction at about 20° C. The viscosity of the solution increases slowly during the reaction. After about one hour while maintaining these reaction conditions, there is obtained polypyromellityl oxamidrazone carboxylic acid with an inherent viscosity of 1.36. The viscosity is determined by measurement of a solution of 0.5 gram of the polymer in 100 ml. dimethyl sulfoxide at 20° C. in all of the examples of this specification.

In the infrared spectrum of a film produced from the solution and dried at 50° C. in vacuum and under nitrogen atmosphere, there is a definite γ—OH vibration at 940 cm.$^{-1}$, a band at 2500 cm.$^{-1}$ being traceable to the —OH vibration of the —COOH group. In addition, amide bands are present at 1650 and 1540 cm.$^{-1}$. This analysis clearly establishes the presence of recurring units of the polymer as noted above.

EXAMPLE 2

The same procedure was followed as in Example 1 except that the oxalic acid bisamidrazone and the pyromellitic acid dianhydride were used in the molar ratio of 1:1. The resulting polymer has an inherent viscosity of 1.1 and exhibits the same infrared spectrum as in Example 1.

EXAMPLE 3

The reaction of Example 1 is again repeated but with the use of a 1 mol percent excess of the pyromellitic acid dianhydride. In this case, a polymer is obtained with an inherent viscosity of 0.62. The IR-spectrum is again identical to that of Example 1.

EXAMPLE 4

To a solution of 0.97 gram (5.05 millimol) of pure terephthalic bisamidrazone in 25 ml. of dimethyl sulfoxide, there is admixed with stirring and under a nitrogen atmosphere 1.09 grams (5 millimol) of pure, solid pyromellitic acid dianhydride. The reaction is carried out for 15 minutes at 50° C. The resulting polymer, identified as polypyromellityl-terephthalbisamidrazone carboxylic acid, exhibits an inherent viscosity of 0.66. The polymer has the recurring units:

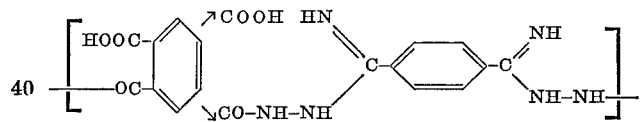

EXAMPLE 5

Under reaction conditions corresponding to Example 4, 0.97 gram (5.05 millimol) of isophthalic bisamidrazone in 25 ml. of dimethyl sulfoxide are brought together with 1.09 g. (=5 millimol) pyromellitic acid dianhydride and reacted at 50° C. The resulting pyromellitylisophthalbisamidrazone carboxylic acid exhibits an inherent viscosity of 0.24. This polymer contains the recurring units:

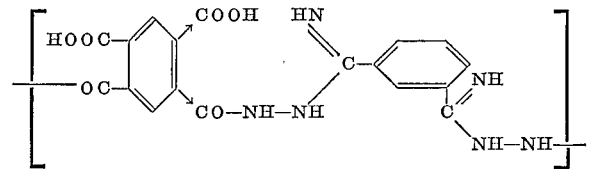

EXAMPLE 6

To a solution of 1.44 grams (10 millimol) of $N^1,N^{1'}$-dimethyl-oxalbisamidrazone in 20 ml. of dimethyl sulfoxide, there are introduced 20° C. with intensive mixing and cooling, as well as under a nitrogen atmosphere, 2.20 grams (10.1 millimol) of pyromellitic acid dianhydride. The reaction is carried out for a period of 1 hour at 20° C. The inherent viscosity of the resulting polypyromellityl-dimethyloxalbisamidrazone carboxylic acid amounts to 0.46. The polymer structure is made up of the recurring units:

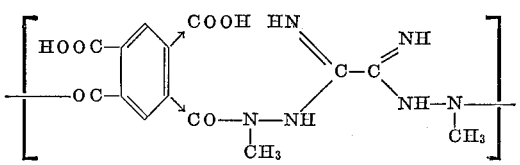

EXAMPLE 7

Under reaction conditions corresponding to Example 6, 1.34 grams (5 millimol) of N³,N³'-diphenyloxalbisamidrazone in 20 ml. of dimethyl sulfoxide are reacted at 20° C. with 1.1 gram (5.05 millimol) of pyromellitic acid dianhydride. The resulting polymer, polypyromellityl-diphenyloxalbisamidrazone carboxylic acid, has an inherent viscosity of 0.62. Its structural formula is made up of the recurring units:

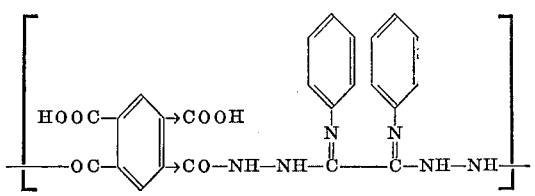

All of the polymers produced according to Examples 4 to 10 also exhibit the bands in the infrared spectrum as explained in Example 1.

EXAMPLE 8

To a solution of 1.17 grams (10.1 millimol) of highly purified oxalic acid bisamidrazone in 25 ml. of tetramethylene sulfoxide, there is admixed with stirring and under a nitrogen atmosphere 1.09 grams (5 millimol) of pure, solid pyromellitic acid dianhydride. The reaction is carried out for 20 minutes at 20° C. The resulting polymer has an inherent viscosity of 1.48 and exhibits the same infrared spectrum as in Example 1.

EXAMPLE 9

To a solution of 1.16 grams (10 millimol) of highly purified oxalic acid bisamidrazone in 65 ml. of freshly distilled N-methylpyrrolidone, there are introduced 2.22 grams (10.2 millimol) of solid pyromellitic acid dianhydride. The reaction is carried out for 10 minutes at 50° C. The resulting polymer has an inherent viscosity of 0.98 and the IR-spectrum is identical to that of Example 1.

EXAMPLE 10

To a solution of 0.96 gram (10 millimol) of pure terephthalic bisamidrazone in 25 ml. dimethyl formamide there are introduced 1.09 grams (5 millimol) of pure, solid pyromellitic acid dianhydride. The reaction is carried out for 10 minutes at 50° C. The resulting polymer exhibits an inherent viscosity of 1.02. The IR-spectrum of the polymer is identical to that Example 4.

The bisamidrazone reacted in accordance with this invention can be represented by the formula of one tautomeric form as follows:

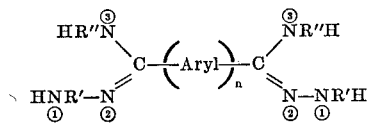

wherein aryl, $n$, R' and R" have the same meanings as set forth above with R' preferably representing hydrogen or methyl and R" preferably representing hydrogen or phenyl, especially where $n$ is zero. The encircled numerals are used with this formula to identify specific nitrogen atoms.

The compound known as oxalbisamidrazone, sometimes referred to as oxalic acid bisamidrazone or more simply as oxamidrazone, is readily prepared in known manner by reacting cyanogen gas (ethane dinitrile of the formula $N{\equiv}C-C{\equiv}N$) with hydrazine hydrate ($N_2H_4 \cdot H_2O$). The terephthal- and isophthal-bisamidrazones can be prepared in the same manner from the corresponding phenylene dinitriles.

The methyl and phenyl substituted compounds can be prepared in accordance with the instructions set forth in two copending U.S. applications, namely: Schöpf et al., Ser. No. 839,666, filed July 7, 1969, and Schulze et al., Ser. No. 838,681, filed July 2, 1969. The disclosures of these two copending applications are therefore incorporated herein by reference as fully as if set forth in their entirety. These applications also fully set forth the various tautomeric forms of the initial methyl- and phenyl-substituted bisamidrazones by their structural formulae. By way of example, the $N^1,N^{1'}$-dimethyl-oxalbisamidrazone is prepared by reacting oxaldiimidic acid diethyl ester with methylhydrazine in an inert solvent such as ethanol, under an inert atmosphere and substantially anhydrous conditions at a temperature of preferably room temperature up to 40° C. The product can be crystallized from ethanol and has a melting point of 163–165° C. while subliming at 135° C. The compound $N^3,N^{3'}$diphenyl-oxalbisamidrazone is conveniently obtained by reacting anhydrous hydrazine with bis-(phenyl)-oximidochloride in an inert organic solvent such as acetonitrile and in the presence of sodium carbonate as an acid acceptor at preferably room temperature to 35° C.

The new polyacylamidrazone carboxylic acids of the invention are preferably those of relatively high molecular weight, i.e. exhibiting an inherent viscosity of at least about 0.2 and preferably about 0.5 to 1.5, measured as a solution of 0.5 gram of polymer in 100 ml. of dimethyl sulfoxide at 20° C.

The invention is hereby claimed as follows:

1. A polyacylamidrazone carboxylic acid which is a film-forming polymer soluble in strongly polar organic solvents and which consists essentially of recurring units of the formula

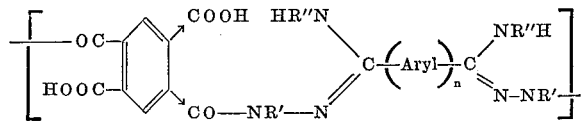

wherein the arrows → denote interchangeable isomeric positions, $n$ is zero or 1, aryl represents 1,4-phenyl or 1,3-phenyl and R' and R" denote hydrogen, methyl or phenyl.

2. A polymer which consists essentially of recurring units of the formula as claimed in claim 1 wherein $n$ is zero and R' and R" each denote hydrogen.

3. A polymer which consists essentially of recurring units of the formula as claimed in claim 1 wherein $n$ is zero, R' denotes methyl and R" denotes hydrogen.

4. A polymer which consists essentially of recurring units of the formula as claimed in claim 1 wherein $n$ is zero, R' denotes hydrogen and R" denotes phenyl.

5. A polymer which consists essentially of recurring units of the formula as claimed in claim 1 wherein $n$ is 1, aryl represents 1,3-phenyl and R' and R" each denote hydrogen.

6. A polymer which consists essentially of recurring units of the formula as claimed in claim 1 wherein $n$ is 1, aryl represents 1,3-phenyl and R' and R" each denote hydrogen.

7. A process for the production of a film-forming polyacylamidrazone carboxylic acid with recurring units of the formula

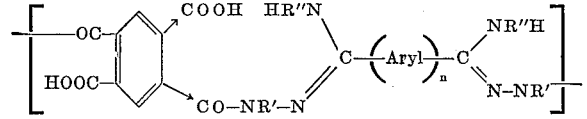

wherein the arrows → denote interchangeable isomeric positions, $n$ is zero or 1, aryl represents 1,4-phenyl or 1,3-phenyl and R' and R" denote hydrogen, methyl or phenyl, said process comprising: reacting pyromellitic acid dianhydride with a bisamidrazone of the formula

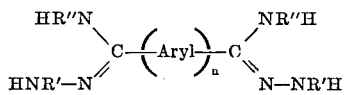

wherein aryl, n, R' and R" have the same meanings as set forth above, in a molar ratio of 1:09 to 0.9:1 and in a strongly polar organic solvent at a temperature of about 0° C. to 70° C.

8. A process as claimed in claim 7 wherein the molar ratio is about 1:0.97 to 0.97:1.

9. A process as claimed in claim 7 wherein the reaction is carried out at a temperature of about 15° C. to 50° C.

10. A process as claimed in claim 7 wherein said solvent is selected from the class consisting of dimethyl sulfoxide, tetramethylene sulfoxide, tetramethylene sulfone, formamide, dimethyl formamide, dimethyl acetamide, N-methylpyrrolidone, hexamethylphosphoric acid triamide and tetramethyl urea.

References Cited

Chem. Abstracts, vol. 66, 1967, 29203s, Ried et al.

WILLIAM H. SHORT, Primary Examiner

H. SCHAIN, Assistant Examiner

U.S. Cl. X.R.

117—161; 260—30.2, 30.4, 30.6, 30.8, 32.4, 32.6

PO-1050
(5/69)

UNITED STATES PATENT OFFICE
CERTIFICATE OF CORRECTION

Patent No. 3,573,261　　　　　　　Dated March 30, 1971

Inventor(s) Hilde Kersten and Gerhard Meyer

It is certified that error appears in the above-identified patent and that said Letters Patent are hereby corrected as shown below:

Column 1, line 26, "frim" should read -- from --.

Column 2, line 24, "toutomeric" should read -- tautomeric -

Column 6, line 52, "Claim 5, "1,3-phenyl" should read -- 1,4-phenyl --.

Column 7, line 2, Claim 7, "1:09" should read -- 1:0.9 --.

Signed and sealed this 24th day of August 1971.

(SEAL)
Attest:

EDWARD M. FLETCHER, JR.　　　　　WILLIAM E. SCHUYLER, JR.
Attesting Officer　　　　　　　　Commissioner of Patents